United States Patent [19]

Fenton et al.

[11] Patent Number: 4,887,437
[45] Date of Patent: Dec. 19, 1989

[54] INTEGRAL FALSE CEILING FOR REFRIGERATED VEHICLES

[75] Inventors: Gary Fenton, Stoughton, Wis.; Tom Huddle, Charleston, Ill.

[73] Assignee: Trailmobile Inc., Chicago, Ill.

[21] Appl. No.: 169,931

[22] Filed: Mar. 18, 1988

[51] Int. Cl.⁴ .............................................. F25D 17/04
[52] U.S. Cl. ........................................ 62/186; 62/329; 62/239; 62/408; 62/447; 98/6
[58] Field of Search ................. 62/239, 407, 408, 329, 62/447, 186, 408; 98/6

[56] References Cited

U.S. PATENT DOCUMENTS

| 2,677,244 | 5/1954 | Wehby | 98/6 X |
| 4,276,754 | 7/1981 | Ty | 62/408 |
| 4,531,377 | 7/1985 | Zajic | 62/239 X |
| 4,553,584 | 11/1985 | Bloomquist | 62/239 X |
| 4,726,196 | 2/1988 | Zajic | 62/408 X |

Primary Examiner—Harold Joyce
Attorney, Agent, or Firm—Myers & Ehrlich

[57] ABSTRACT

An integral false ceiling for a refrigerated vehicle body using a sealed ductwork, flow restriction and bleed means to provide selective transmission of refrigerated air to one or more cargo compartments in the vehicle body and return of air to an air conditioning unit, enhancing temperature control and minimizing intrusion into the cargo compartments.

17 Claims, 5 Drawing Sheets

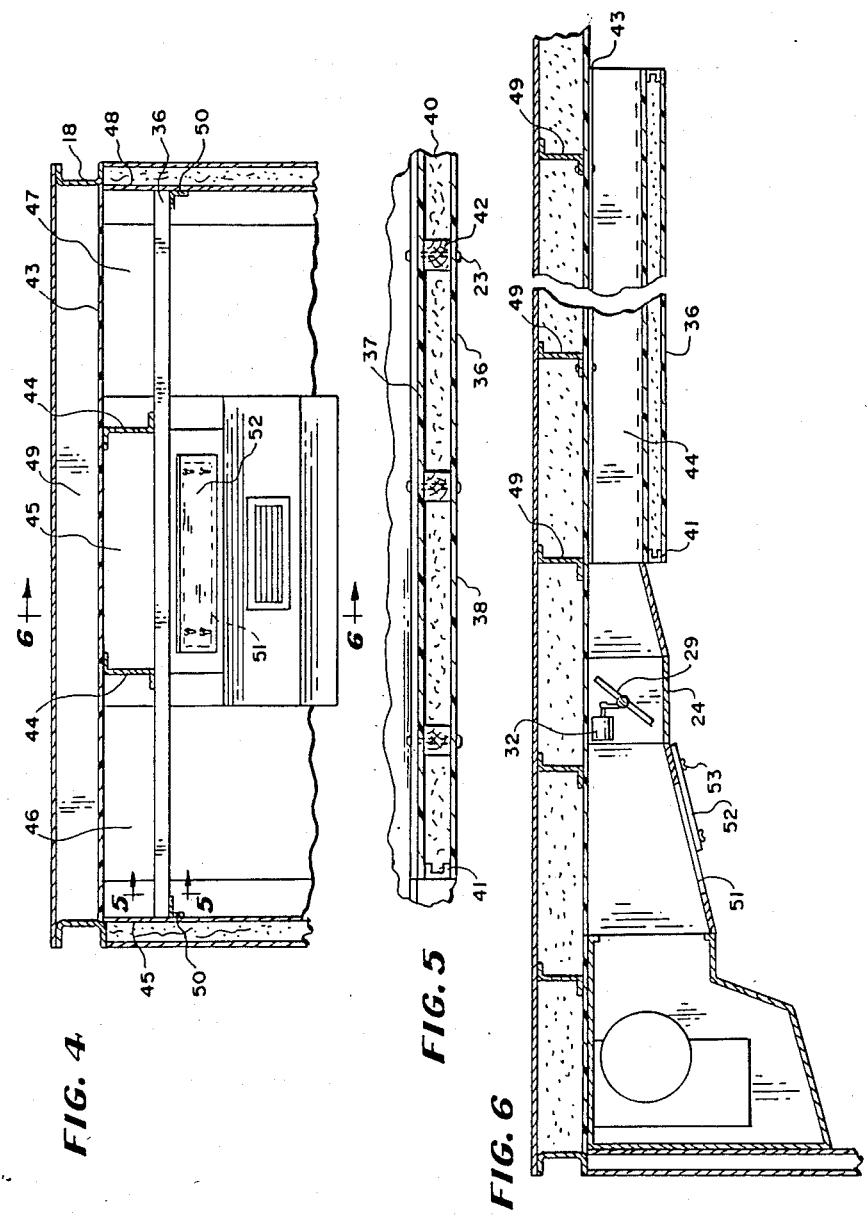

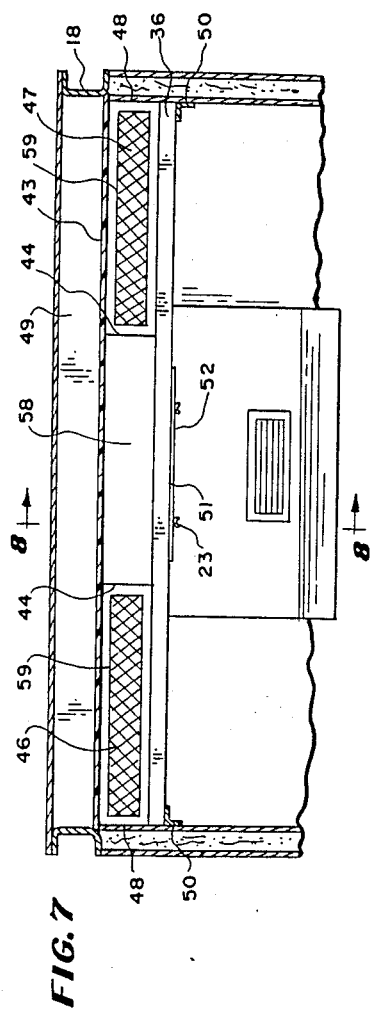
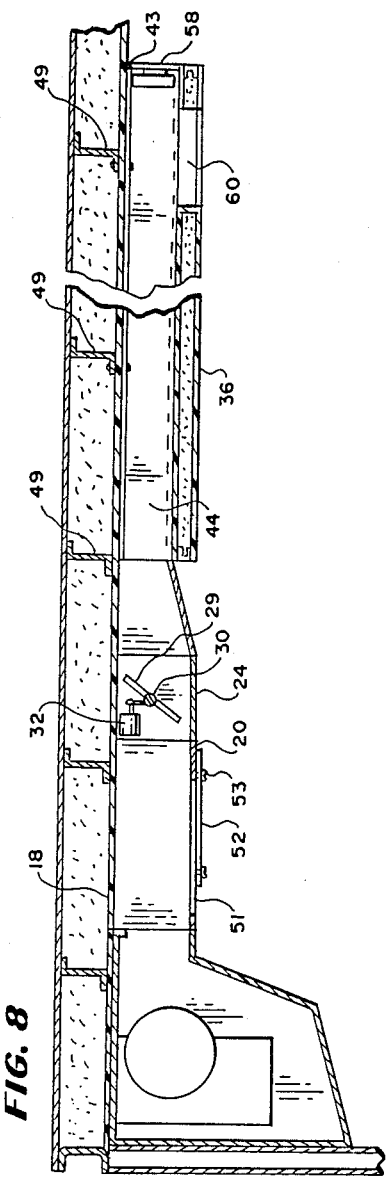

INTEGRAL FALSE CEILING FOR REFRIGERATED VEHICLES

BACKGROUND OF THE INVENTION

1. Field of the Invention

This invention relates to the field of temperature controlled vehicle bodies, and particularly to semi-trailers with a refrigeration unit, ducts and a false ceiling structure.

2. Summary of the Invention

In the field of temperature controlled vehicle bodies and more particularly refrigerated semi-trailers it has been long recognized that the promotion of air circulation greatly enhances the efficiency of the temperature controlling operation. This invention relates to the use of ducts and a false ceiling structure to maximize efficient circulation of air and minimize intrusions in the cargo area or areas.

While this invention is primarily designed for refrigerated semi-trailers, it equally applicable to other cargo carrying structures such as shipping containers, railroad cars and the like and would relate to any temperature control situation whether the temperature of the cargo is to be elevated or lowered. Further the preferred embodiment is adapted to use in a multiple compartmented vehicle however it would also enhance air circulation in a vehicle with a single compartment.

Numerous advantages are provided by the configuration disclosed herein.

One object of the invention is to provide a ceiling structure which has fewer projections, corners or edges extending into the compartment.

Another object of the invention is to provided greater control in the airflow into the first compartment of a compartmentalized semi-trailer permitting a greater degree of control over the location of hot or cold spots on the cargo carried in the compartment.

Another advantage from the greater degree of control in addition to control over the direction of airflow is the greater degree of control over the quantity of airflow providing greater control over the temperature in the compartments generally.

Another object of the invention is in improvement in the efficiency in airflow direction resulting from the sealing of the entire series of refrigerated air duct work, the minimization of the placement of obstructions in the air current and avoidance of turbulence causing members.

Another advantage to the invention is the use of transition elements utilizing relatively straightforward sheet metal forming techniques which permit adaptation to alternative refrigerator units having integral ducts through substitution of a single sheet metal formed first transition element without significant loss in efficiency as opposed to unconnected or unsealed prior art configurations.

Another advantage to the invention is that the placement of parts movable to control airflow can be made so as to more closely align those parts with the direction of airflow further increasing efficiency and reducing turbulence.

Another advantage to the invention is that more accurate temperature control is possible because a higher degree of control over the leakage of refrigerated air around or past prior art air deflection mechanisms.

Another advantage of the invention is that an integral sealed false ceiling and duct work configuration favorably contributes to the overall strength and insulation and properties of the trailer roof structure.

Another advantage to an integral sealed configuration is that it is less prone to become soiled through the entry of materials, particulate or the like into the central refrigeration duct system because it is under pressure and is not generally open to the first compartment generally as are prior art funnel type or deflector type configuration.

Another advantage to the invention is that build up of frost or ice is less likely then in prior systems because projections into the refrigerated air current are reduced in number and components are aligned more closely parallel to the direction of flow.

Other advantages will become apparent upon on further reading of the specification.

3. Background of the Prior Art

The funtion of providing variable or adjustable control over air flow in refrigerated semi-trailers can be performed by varied structures including at its simplest a fabric duct work attached to the ceiling with spaced removable fasteners providing for adjustment of the air flow by the simple expedient of unfastening selected fasteners thereby permitting air to spill out of the duct work at a predetermined position.

The invention relates to the use of substantially rigid duct work providing air passageways. In this art there are essentially three types of arrangements or devices used to control air flow. These arrangements are bleed air valve devices, air flow restriction devices and air flow diverting devices.

The first mentioned controlling devices operate in conjunction with passageways in which pressurized air flows. By opening valves air is permitted to flow from within the pressurized passageways out of the passageway into a cargo compartment. A series of valves provides greater selectivity in terms of directing air to desired locations in a single compartment or into selected separated compartments.

An example of bleed air refrigerated semi-trailer flow control is disclosed in U.S. Pat. No. 2,677,244 issued to Wehby May 4, 1954. This patent utilizes L section ducts opened to a refrigeration compartment in which dry ice is placed with a fan circulating the air through the duct and with rotating vane type valves permitting the selective direction of air from the pressurized duct into a compartment in which the direction of refrigerated air is desired. Return air is moved through a corresponding L shaped duct placed in the opposite top corner from the pressurized duct.

Flow diverting devices or mechanisms are placed within a storage compartment and present a face surface at an angle to an air current in the compartment as will discussed in connection with U.S. Pat. No. 4,531,377 and art cited therein. Flow diverting devices present at least one edge around which the air current is permitted to flow into the compartment itself. These diverting plates may be presented at an angle greater than, equal to or less than perpendicular to the direction of the air current and change the direction of at least a portion of the air current caused by aerodynamic forces caused by the substantially flat body placed in an air current.

An item of prior art which contains this type of air flow control is revealed in U.S. Pat. No. 4,531,377 issued to Zajic Jul. 30, 1985. As will be noted herein this prior art also uses the air diverting type of control.

Further the file wrapper for Zajic reveals yet another prior art structure which also uses the damper type control and the air diverting type control. Moving an open damper into a closed position increases resistance to the air flow within the confines of the passageway or duct. Accordingly pressure is increased on the upstream side and the pressure difference between upstream and downstream sides is also increased, thereby decreasing the volume of cooling air available to be directed into any compartment or portion of a compartment downstream of the damper. The air flow diverting plate in Zajic constitutes a hinged plate hinged at its edge most remote from the source of refrigerated air with its edge nearest the source of refrigerated air being adjustably supported so as to select a desired angle relative the direction the flow of a current of air passing from the refrigerator unit into the chambers in which the structure is located. The hinge is placed at the bottom of duct work which is connected to the damper previously described. Because of the duct work and the velocity of the air current and the returns interconnected with the ducts and compartments, a portion of air in the air current from the refrigerator unit will be carried through the duct system. At such time as the pressure downstream the diverting plate equals that upstream the air will, however, flow around the forward most edge and directly into the first compartment.

The Polar American trailer prior art drawing which is contained in the file history of the Zajic patent also utilizes a flow diversion plate, although this structure is hinged from the roof of the trailer.

Another item of prior art is a false ceiling refrigerated stripping container made by assignee Trailmobile, Inc. in approximately 1972 utilizing a false ceiling structure with a funnel-like air current directing structure near the refrigerator unit outlet. This provided a straight through passage way to the rear of the container, having no flow regulation structures. The air current directing structure had no moving parts or adjustment.

Air flow restriction devices or means operate within a passageway in control air flow by obstructing air flow through increasing the surface area presented to the air flow as it flows through a passageway of fixed area. Typically these devices constitute dampers pivoting about a transverse axis presenting substantially an edge of a plate to the air flow when in an open position and presenting substantially the flow face of a plate in a close position with intermediate positions being selectable.

BRIEF DESCRIPTION OF THE DRAWINGS

FIG. 4 is a sectional view looking forward at line 4—4 of FIG. 1.

FIG. 5 is a sectional view looking toward the right side taken at line 5—5 of FIG. 4.

FIG. 6 is a sectional view looking toward the right side taken at line 6—6 of FIG. 4.

FIG. 7 is a sectional view of an alternate embodiment corresponding to the view FIG. 4.

FIG. 8 is a sectional view looking toward the right side taken at line 8—8 of FIG. 7.

DETAILED DESCRIPTION OF THE PREFERRED EMBODIMENT

Figure 1:
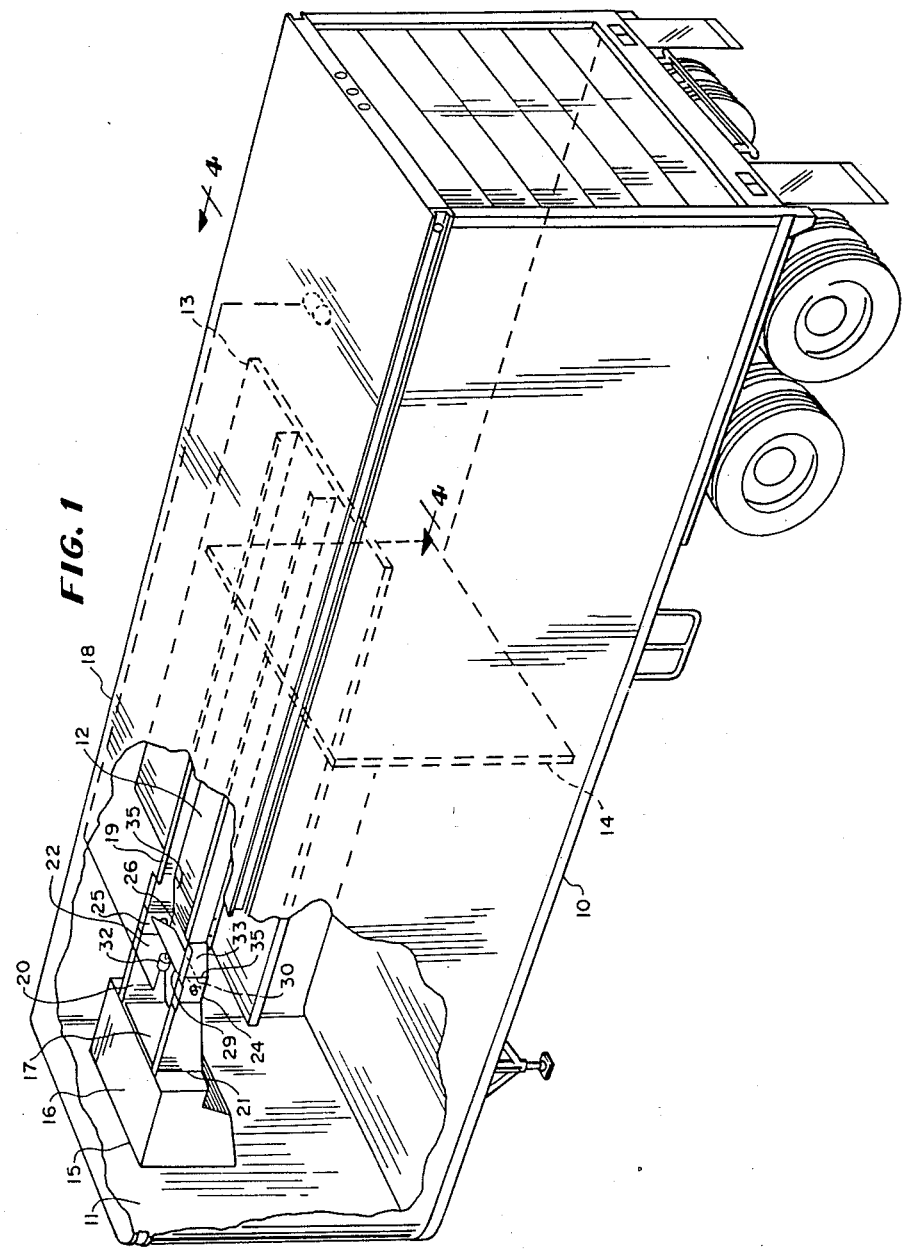
FIG. 1 is a perspective cut away view of a refrigerated semitrailer.

As shown in FIG. 1 the preferred embodiment utilizes a continuous series of duct work (12) including both ducts and false ceiling structure extending rearwardly from the front wall (11) of a semi trailer (10) terminating at a desired location (13) rearward in the semi trailer. The termination will typically be in the rearward half of the semi trailer but the precise location depends upon the anticipated usage of compartments. Typically this will be approximately ¾ of the length of the trailer so as to permit termination of the false ceiling a far enough rearward for the trailer to be configured into three compartments with sufficient clearance at the rear to permit such items as tracks for roll up overhead doors at the rear of the trailer. In the preferred embodiment a movable bulkhead (14) divides the trailer into two compartments.

The most commonly utilized mechanical refrigeration unit (15) in the semi-trailer field incorporates an integral duct (16) which extends rearward from the front wall (11) of the trailer approximately three (3) feet. Typically a unit's refrigeration outlet (17) can be located approximately one (1) foot below the roof (18) of the trailer but other models have outlets at other locations including adjacent to the ceiling. In the use of a false ceiling duct system it is desirable to have the ducts and false ceiling structure intrude upon the cargo space as little as possible. Accordingly, it is desirable to transition from the refrigerator unit duct (16) to the false ceiling structure (19) in a minimum dimension consistent with minimum resistance to the passage of refrigerated air through an appropriate duct structure.

As will be further discussed herein, a temperature sensing device (55) is located at the rear and is electrically connected (56) to a solenoid (32) for controlling air flow.

Maximum efficiency in the transfer of refrigerated air into the false ceiling structure can be attained through the direct connection of the false ceiling structure (19) to the refrigeration unit duct (16). This is accomplished with a first transition duct (20) configured so as to have a front end (22) which mates with the refrigeration unit duct (16) and is attached thereto through the use of permanent fastening means such as rivets (23) or the like and sealed using caulking, gaskets, adhesive compounds or mechanically sealing joints known in the sheet metal working art.

Figure 2:
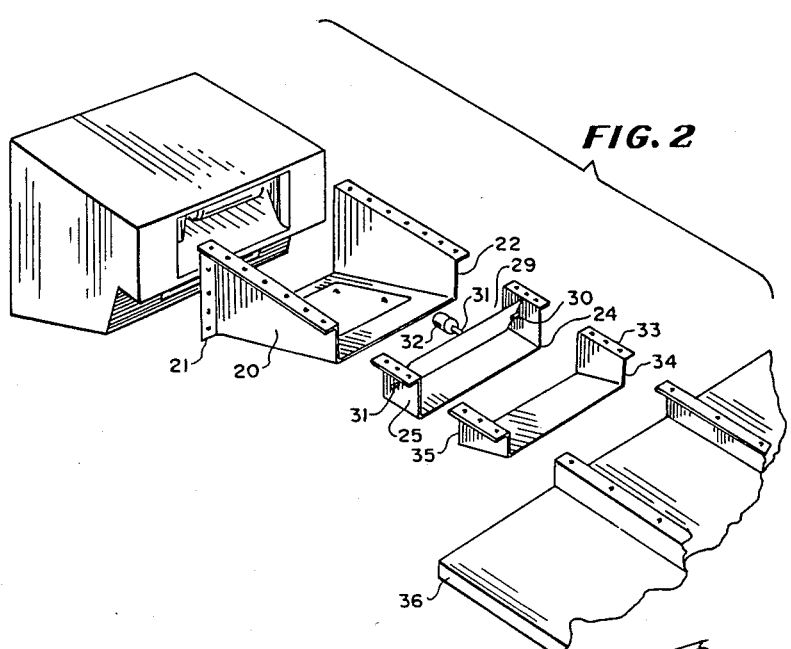
FIG. 2 is an exploded perspective view of the ducts in a refrigerated trailer looking generally from the top, left side.
Figure 3:
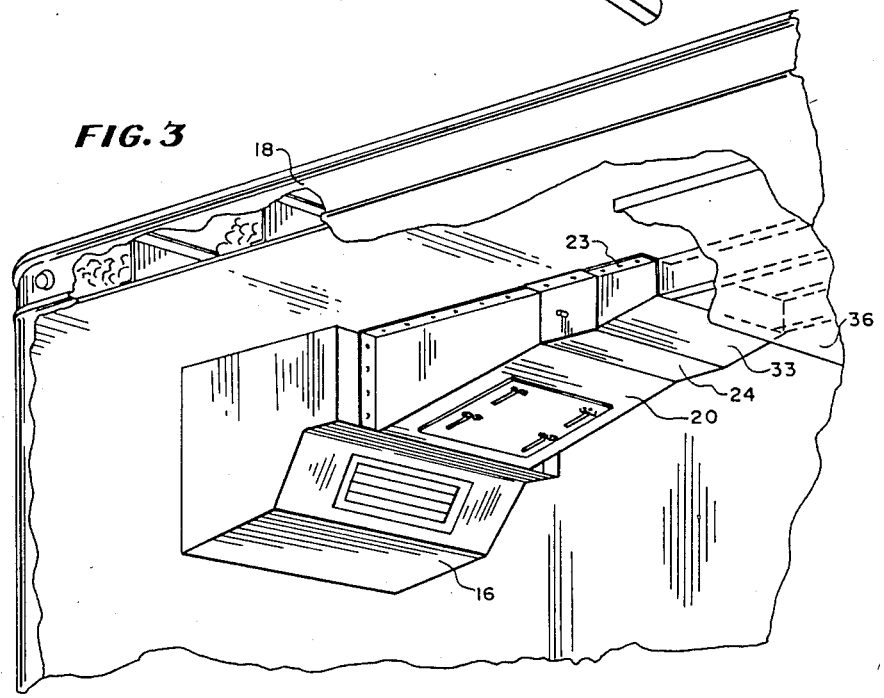
FIG. 3 is a perspective cutaway view of the ducts in a refrigerated trailer looking generally from the bottom, left side.

FIG. 2 shows that at its rearward end (22) the first transition duct is attached to a damper housing (24) comprising side walls (25) and a bottom wall (26) which, with a top skin shown in other figures, define a rectangular passageway. A substantially rectangular plate (29) is pivotally mounted on a transverse axis (30) which may be selectively rotated by linkage (31) operated by a solenoid (32) so as to present a greater or lesser surface area to restrict the air flow through the damper housing. The rear of the damper housing (24) is attached to a second transition duct (33) which connects at its rear (35) to the false ceiling structure (19).

The damper plate (29) rotates about its axis (30) presenting a desired surface area within the confines of the damper housing (24). The rotation is controlled by a thermostatically controlled solenoid (32) acting through appropriate linkage (31), or other methods known in the art.

The pressure differential caused by the mechanical components of the refrigeration unit communicating with the ducts return in conjunction with the changes in density between refrigerated air and the return air of relatively elevated temperature results in a natural return flow in the outboard ducts (46) and (47).

The exiting of refrigerating air from the central duct (45) into the first compartment is accomplished through a bleed air valve (51). When opened this provides a method for the pressurized refrigerated air to escape into the first compartment. In the preferred embodiment this bleed air function is performed by a selectively controlled sliding gate (52) which may be placed in the first transition duct (20) forward of the damper. Selectively control may be exercised through mechanical mechanisms (53) operated manually, or by other appropriate means.

As shown in FIG. 5 the false ceiling structure in the preferred embodiment utilizes a continuous surface element (36) extending substantially the entire width of the trailer and extending from the second (33) transition duct rearward to the desired termination (13). As previously discussed, this is approximately ¾ of the length of the trailer from the front of the trailer. As shown in FIG. 6, in the preferred embodiment this surface element comprises a top (37) and bottom (38) sheet of semi-rigid material sandwiching an insulating material (39). The edges of the surface element in the preferred embodiment comprise channel section elements (41) providing edge closure, insulation retention and added rigidity. Additional tranverse structural spacing elements (42) can also be provided.

In the preferred embodiment the sheet material (37) and (38) can be a material such as aluminum sheet, glass reinforced plastic or the like. The insulation (40) is an expanded plastic. In the preferred embodiment spacing elements (42) of hardwood can be added for increased rigidity, accomodation of fasteners, fabrication enalement and structural strength. The strength of the sheet skins and the bonding properties of the insulating foam forms a rigid continuous element of relatively light weight with superior insulating properties. The use of other configurations is not precluded provided the structural and insulating properties are met.

The aforementioned sandwich surface constitutes the bottom of the false ceiling from the point of view of the cargo compartment. The structure is completed with the placement of a duct ceiling (43) and two (2) spaced longitudinal interior walls (44) dividing the available space into three (3) longitudinal ducts (45), (46) and (47). The central duct (45) constitutes the refrigerated air duct, and the (2) exterior ducts (46 and 47) constitute returns. The longitudinal walls defining the outer walls of the return ducts are the interior surfaces of the walls of the trailer (48).

As shown in FIG. 4, in the preferred embodiment the longitudinal interior walls (44) are fabricated from suitable materials such as aluminum sheet suspended from suitable hanger members or roof support elements (49) at the top of the semi trailer. The longitudinal interior walls (44) provide both structural support and air tight duct walls. Angle section longitudinal supporting members (50) are utilized to provide support of the edges of the sandwich surface and to seal said returns against the semi trailer walls. The angle section longitudinal members (50) are fastened to the trailer walls (48) and surface element (36) by riveting and caulking, welding or a combination of these methods. Other embodiments such as with a single refrigeration duct and single return are also feasible.

It has been determined that this configuration provides effective aerodynamic flow through the utilization of substantially smooth surfaces for the ducts while minimizing the fabrication of custom parts and the need for the maintenance of inventory of custom parts while providing ease of fabrication and assembly. Alternative embodiments could be utilized in an appropriate application which would be anticipated to include such things as the use of extruded components, the use of glass reinforced plastic walls or ceiling elements or, in a suitable trailer construction, the use of the cargo carrier roof (18) itself as the duct ceiling provided same is relatively free from obstructions to air flow so as to permit a smooth air flow through the duct.

FIG. 7 shows an alternative embodiment in which straight rather than a sloped transition duct is used. In this view an end plate (58) covers the end of the central refrigeration duct. Screens (59) cover the returns (46, 47) minimizing entry of foreign matters.

In FIG. 8 the end plate (58) is shown and the exiting of refrigerated air is directed downward through an opening (60) in the sandwich element (36). The first transition duct (20) is substantially parallel to the trailer roof (18).

Figure 9:
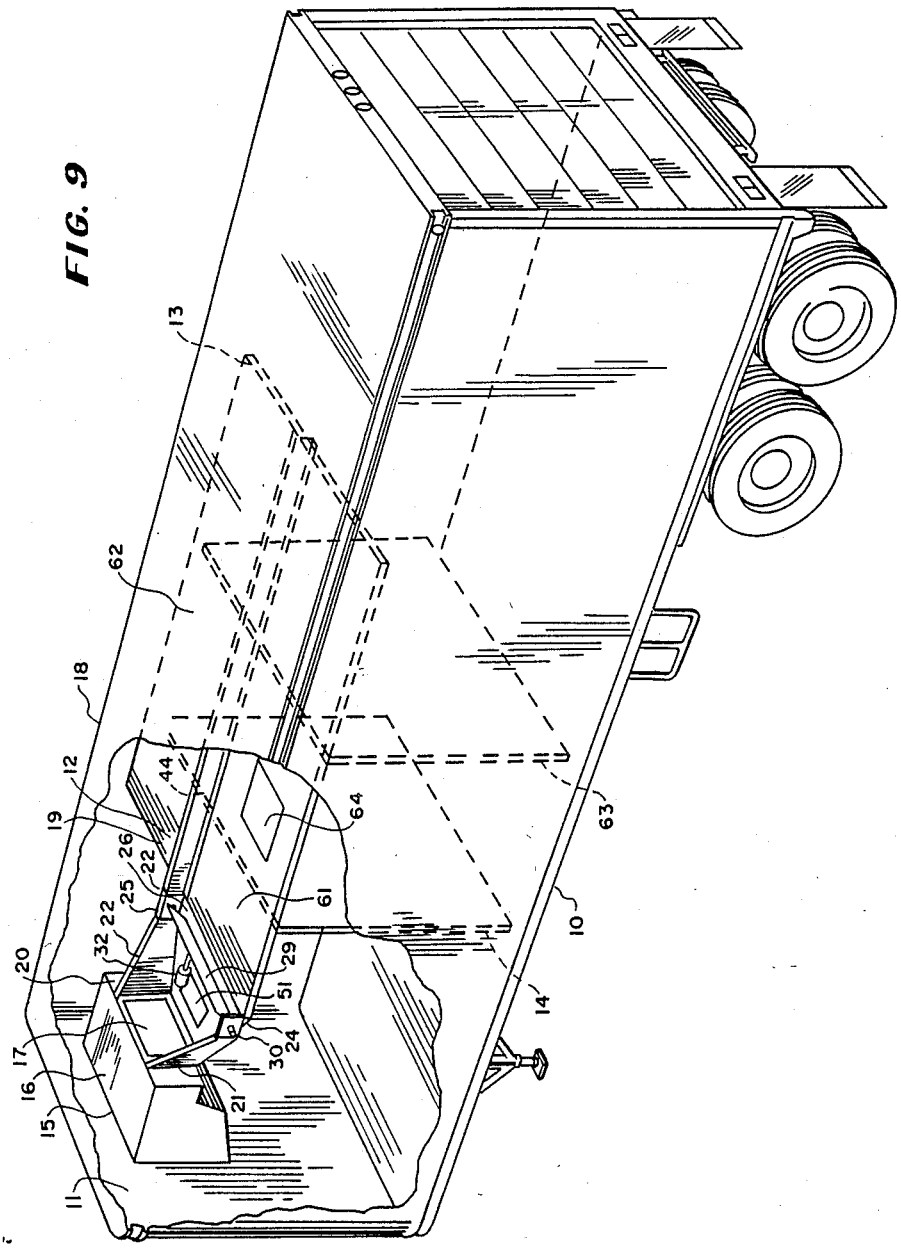
FIG. 9 is a perspective cutaway view of an alternative embodiment.

FIG. 9 shows another alternative embodiment. It may be noted that features of the preferred and various alternative embodiment may be combined based on specific needs. In this embodiment a single longitudinal interior wall (44) defines two rather than three ducts for refrigerated (61) and return (62) air. Further, this figure illustrates an embodiment where two transverse movable trailer bulkheads (14) and (63) define three rather than two trailer compartments. Indeed, movable bulkheads may be used which may even be removed to permit use as a single compartment trailer. Air bleed into the central compartment is permitted through a second air bleed valve (64) whose structure may be expected to be analogous to the first air bleed valve (51). A plurality of air bleed valves along the ductwork permits greater control over airflow.

The duct structure terminates in the rear most compartment in a multiple compartment semi trailer or in the rear portion of a single compartment trailer as has been previously discussed. Screens or other devices can be placed over the return rear and front terminations to limit entry of foreign matter into the system.

In accordance with the invention I claim:

1. Air conditioning means and duct means for a trailer having divided temperature controlled first and second thermally separate compartments comprising at the first compartment an air conditioner and substantially enclosed overhead duct directly connected with the air conditioner, said duct having a bottom wall and first and second portions extending respectively into both compartments and having an opening in the second compartment;

flow restricting means in the first portion of the duct in the first compartment, temperature control means in one compartment, said flow restricting means in the duct connecting with the temperature control means and openable and closable thereby in response to temperature changes in the compartment;

bleed air means in the duct to permit exiting of air from the duct into the first compartment, and said bleed air means being adjustable to incrementally allow flow of temperature conditioned air from the duct into the first compartment;

said bleed air means comprising a valve means in the bottom wall of the duct;

said valve means including a sliding member mechanically adjustable to increase and decrease the opening for venting temperature controlled air into the first compartment.

2. In a cargo carrying body having front and rear ends, side walls, a roof and a floor; and having air conditioning means mounted at one end;

a first and second tube, each tube comprising upper, lower and side surfaces;

said first tube being a conditioned air transmission tube extending from the air conditioning means to termination inside said body, said termination being remote from said air conditioning means;

said second tube being a return tube extending from the termination of the first tube toward the air conditioning means;

said first tube being non-removably attached to said roof;

said first tube having air bleed means near said air conditioning means;

said first tube having air flow restriction means between said air bleed and said termination of said first tube, and said air bleed means being mounted in the lower surface of said first tube and comprising a sliding valve mechanically adjustable to control the amount of air flowing out of said valve.

3. The invention according to claim 2, and said air flow means comprising a thermostatically controlled damper pivotally carried in a damper housing;

said damper being controlled by temperature sensing means connected to the damper and placed in said body at a place remote from said air conditioning unit.

4. The invention according to claim 3, and said tube comprising;

a first transition duct connecting said air conditioning unit to said damper housing;

said damper housing connecting said first transition duct to a second transition duct connecting said damper housing to false ceiling duct means;

said false ceiling duct means defining a portion of said first tube and defining said second tube;

5. The invention according to claim 4, and said tube elements sealed and riveted to one another.

6. The invention according to claim 5, and said first and second transition duct have upwardly sloped lower surfaces.

7. The invention according to claim 6, and said first transition duct having a lower surface substantially parallel to said roof.

8. In a cargo carrying body having front and rear ends, side walls, a roof and a floor; and having air conditioning means mounted at one end;

a first and second tube, each tube comprising upper, lower and side surfaces;

said first tube being a conditioned air transmission tube extending from the air conditioning means to termination inside said body, said termination being remote from said air conditioning means;

said second tube being a return tube extending from the termination of the first tube toward the air conditioning means;

said first tube being non-removably attached to said roof;

said first tube having air bleed means near said air conditioning means;

said first tube having air flow restriction means between said air bleed and said termination of said first tube; and said air bleed means being mounted in the lower surface of said first tube and comprising a sliding valve mechanically adjustable to control the amount of air flowing out of said valve. and a damper housing mounted in the body, said air flow restriction means comprising a thermostatically controlled damper pivotally carried in said damper housing;

said damper being controlled by temperature sensing means connected to the damper and placed in said body at a place remote from said air conditioning means, and said first tube comprising;

a first transition duct connecting said air conditioning unit to said damper housing;

said damper housing connecting said first transition duct to a second transition duct and connecting said damper housing to false ceiling duct means;

said false ceiling duct means defining a portion of said first and second tubes; and said first and second tube elements being sealed and secured to one another. and said first and second transition ducts having upwardly sloped lower surfaces. and said damper housing having a lower surface substantially parallel to said roof, and said valve being placed in said sloped surface of said first transition duct; and said valve sliding in a direction parallel to said surface.

9. The invention according to claim 8, and said body having at least one thermal barrier bulkhead subdividing said body into compartments.

10. The invention according to claim 9, and said false ceiling means defining two return tubes.

11. The invention according to claim 10, and said conditioned air termination having end plate means and said false ceiling means having a lower surface relieved near said termination to define an air flow opening.

12. The invention according to claim 11, and said return tubes having screens covering both ends.

13. The invention according to claim 9, and said false ceiling means define one return tube.

14. The invention according to claim 9, and said body having two thermal barrier bulkheads subdividing said body into three compartments;

a second bleed air valve is provided to permit conditioned air to enter the central compartment;

said return tube is relieved to define an opening to exhaust air from said central compartment.

15. A vehicle body having side walls, fore and aft end walls, a roof and a floor and having an air conditioner at the fore end wall;

the vehicle body having thermal barrier bulkhead means subdividing it into first and second temperature controlled compartments;

the vehicle body having false ceiling means spaced below the roof providing passageways therebetween for the transmission and return of conditioned air, said passageways communicating between the compartments and having first ends in the first compartment and second ends in the second compartment;

duct means having upper, side and lower members defining tube means fixedly interconnecting the air conditioner and the first end of the transmission passageway of the false ceiling means;

flow restricting means in the tube means;

temperature control means in the second compartment operably connecting with the flow restriction means for controlling the amount of cooled air in the second compartment; and air bleed means in the tube means between the flow restricting means and the air conditioner and located in the lower member of the tube means;

the air bleed means being adjustable to control the amount of air allowed to flow from the tube means into the first compartment while providing substantially unrestricted flow of the conditioned air through the tube means.

16. The Invention according to claim 15 and
the air bleed means being a sliding valve having a sliding gate sliding substantially perpendicular to the lower member of the tube.

17. The Invention according to claim 16 and
the tube comprising a first transition element, a flow restriction means housing and a second transition element, the first transition element interconnecting the air conditioner and the housing, the housing interconnecting the first element and second element and the second element interconnecting the housing and false ceiling means, whereby a continuous tube is provided for the transmission of conditioned air into the vehicle body.

* * * * *